United States Patent [19]

Christiansen et al.

[11] Patent Number: 4,537,741
[45] Date of Patent: Aug. 27, 1985

[54] FUNNEL FOR FUEL PIN LOADING SYSTEM

[75] Inventors: David W. Christiansen, Kennewick; Jim M. Steffen, Richland; William F. Brown, West Richland, all of Wash.

[73] Assignee: The United States of America as represented by the United States Department of Energy, Washington, D.C.

[21] Appl. No.: 445,605

[22] Filed: Nov. 30, 1982

[51] Int. Cl.³ .............................................. G21C 19/00
[52] U.S. Cl. .................................................. 376/261
[58] Field of Search .............. 376/260, 261, 262, 264, 376/409; 29/723

[56] References Cited

U.S. PATENT DOCUMENTS

| | | | |
|---|---|---|---|
| 3,746,190 | 7/1973 | Hotz | 414/146 |
| 3,925,965 | 12/1975 | Rushworth | 53/255 |
| 4,158,601 | 6/1979 | Gerkey | 376/261 |
| 4,235,066 | 11/1980 | King et al. | 53/252 |

Primary Examiner—Deborah L. Kyle
Assistant Examiner—Richard Klein
Attorney, Agent, or Firm—Edward W. Nypaver; Robert Southworth III; Judson R. Hightower

[57] ABSTRACT

An enlarged funnel is releasably mounted at the open end of a length of cladding by an encircling length of shrink tubing which securely engages outer surfaces of both the funnel and cladding. The shrink tubing overlaps an annular shoulder against which pulling force can be exerted to remove the tubing from the cladding. The shoulder can be provided on a separate collar or ring, or on the funnel itself.

7 Claims, 2 Drawing Figures

FUNNEL FOR FUEL PIN LOADING SYSTEM

The U.S. government has rights in this invention pursuant to Contract DE-AC14-76FF02170 between the U.S. Department of Energy and Westinghouse Electric Corporation.

BACKGROUND OF THE INVENTION

The present invention relates generally to automated loading of fuel assemblies for nuclear reactors. It comprises a funnel assembly temporarily mounted on a length of cladding to facilitate automated loading procedures.

This disclosure relates to a unique funnel assembly that is frictionally held in place at the open end of a length of cladding to present an enlarged diameter extension to facilitate loading of fuel pellets.

Prior devices for automatically filling fuel pellets within lengths of cladding have used stationary feeding heads having tapered inner surfaces for guiding the pellets into an abutting open end of the cladding. Examples are shown in U.S. Pat. No. 3,746,190 (element 24) and U.S. Pat. No. 4,158,601 (element 88).

When designing a fuel loading system that is totally automated, very careful attention must be directed to contamination difficulties. Merely contacting a feed head with the open cylindrical end of a length of cladding presents substantial possibilities of contamination as a result of such simple abutting contact. The present disclosure addresses this problem by utilizing a discardable funnel mounted within each length of cladding and by protecting the outer surfaces of both the funnel and cladding by utilization of an encircling length of shrink tubing.

SUMMARY OF THE INVENTION

It is an object of this invention to minimize spread of contamination at the open end of cladding which has been loaded with fuel pellets by automated equipment by providing a discardable funnel and protective length of shrink tubing which can be removed from the cladding immediately after the loading sequence.

Another object of the invention is to provide a funnel assembly at the open end of a length of cladding which can be readily removed from the cladding by pulling it as the cladding is retracted.

Another object of the invention is to provide such a funnel assembly which is relatively inexpensive and which does not substantially add to the length or bulk of the cladding.

Another object of the invention is to incorporate within the funnel assembly a protective covering of shrink tubing which assists in preventing particles from being imbedded within the outer surface of the cladding by their engagement by contacting sealing elements.

Additional objects, advantages and novel features of the invention will be set forth in part by the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention as embodied and broadly described herein, the apparatus of this invention may comprise a funnel having an enlarged outer open end leading to a reduced diameter neck at least partially inserted into the open axial end of a length of cladding as a coaxial extension of it. A continuous length of tubing is shrunk about both the cladding and the funnel to maintain them as a unit during reception of fuel into the cladding through the funnel open end. The tubing and funnel are readily removable by engaging the tubing and pulling it from the cladding as the cladding is retracted. A rearwardly-facing shoulder beneath the shrink tubing facilitates such engagement. Removal of the funnel assembly from the cladding is preferably accomplished immediately after the insertion of fuel pellets.

BRIEF DESCRIPTION OF THE DRAWINGS

The accompanying drawings, which are incorporated into and form a part of the specification, illustrate several embodiments of the present invention and, together with the description, serve to explain the principles of the invention. In the drawings.

DETAILED DESCRIPTION OF THE INVENTION

This invention is directed to a funnel structure adapted to be arranged at the outer open end of a length of cladding which will ultimately contain fuel pellets as a nuclear fuel pin. It is utilized on a fuel pin subassembly which facilitates loading of fuel pellets within the cladding. A funnel is held in place by a length of shrink tubing that encircles both the funnel and cladding outer surfaces. The tubing serves as a protective cover about the encircled portion of the cladding outer surfaces. It also facilitates axial removal of the funnel after loading of the cladding.

Figure 1:
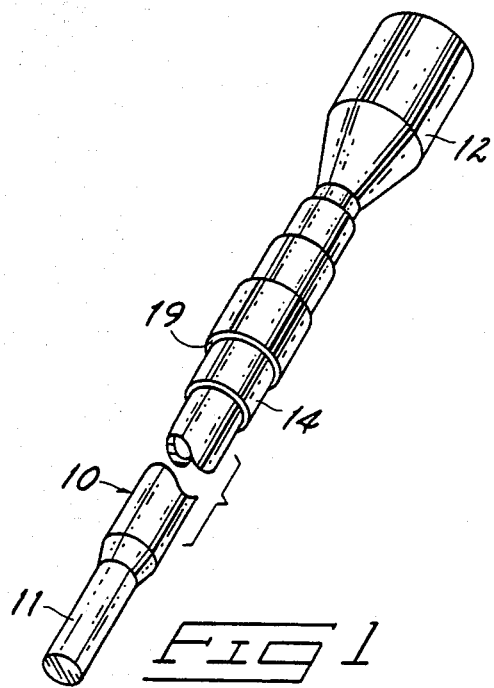
FIG. 1 is a fragmentary perspective view of the outer ends of a preassembled fuel pin prepared for the system.
Figure 2:
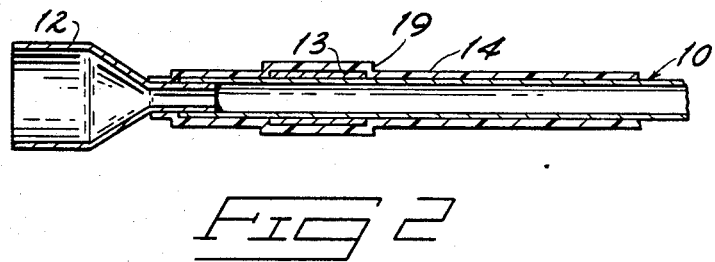
FIG. 2 is a cross-sectional axial view along the open end of a prepared fuel pin.

A completed fuel pin subassembly is shown in FIG. 2. The subassembly consists of a length of cladding 10 having a welded end cap 11, shown as the bottom end of the fuel pin, and internal non-contaminated fuel pin hardware (not shown) adjacent the welded end cap 11. A fuel loading funnel 12 is mounted to the remaining open end of the fuel cladding 10.

As shown in FIG. 2, the funnel 12 has an enlarged outer open end that leads to a reduced diameter neck. A conical transition section connects the open end of funnel 12 to its neck. The smaller neck is at least partially inserted into the open axial end of the cladding as a coaxial extension of it. The fit between the funnel neck and the cladding interior should be reasonably close, and the thickness of the funnel neck should be minimal.

The funnel 12 is held within the length of cladding 10 by a continuous length of plastic shrink tubing 4. After placement overlapping a portion of both the funnel and cladding, the tubing 14 is shrunk diametrically by proper application of heat. It tightly encircles and grips both the cladding 10 and funnel 12. It maintains them as a unit during reception of fuel into the cladding through the funnel 12.

The funnel 12 is designed to be discarded after the length of cladding 10 has been charged with fuel pellets. Removal of the funnel is accomplished by pulling tubing 14 as cladding 10 is retracted axially. Removal is facilitated by providing a slidable collar or ring 13 that surrounds cladding 10 beneath the shrink tubing 14. The coaxial ring 13 presents a rear annular shoulder 19 which can be engaged to pull ring 13, tubing 14 and funnel 12 as a unit. If desired, the shoulder 19 could be presented as part of that portion of funnel 12 enveloped under the shrink tubing 14.

The tubing 14 preferably extends along the outer surface of cladding 10 an an outer protective element. It provides a cylindrical surface for engagement by resilient or inflatable seals. Particles embedded in the tubing 14 as a result of such sealing will be discarded with the tubing when it is removed. This minimizes contamination of the cladding itself.

It is to be understood that the funnel 12 could have many different interior or exterior configurations, so as to match the physical shape and requirements of particular pellet loading devices. These modifications are not believed to be pertinent to the present disclosure, since they will not change the manner by which the funnel is related to the length of cladding.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments discussed in detail were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In combination with a length of tubular fuel cladding for a nuclear reactor, in which the cladding has an open axial end;

a funnel mounted to the open axial end of the cladding, said funnel having an enlarged outer open end leading to a reduced diameter neck that is at least partially inserted within the open axial end of the cladding as a coaxial outwardly protruding attachment;

and a continuous length of tubing shrunk about both the cladding and funnel to grip and maintain them as a unit during handling of the unfilled cladding and reception of fuel into the cladding through the attached funnel.

2. The combination of claim 1, further comprising:

a cylindrical ring coaxially fitted about the cladding and covered by said tubing, said ring having a rear annular shoulder facing opposite to the open end of the funnel and adapted to be engageable for pulling the ring, tubing and funnel from the cladding.

3. The combination of claim 1, wherein the length of tubing is composed of plastic resin capable of being shrunk diametrically by application of heat.

4. In combination with a length of nuclear fuel cladding having an inner cylindrical diameter and an outer cylindrical diameter, in which the cladding is partially pre-assembled for loading of fuel pellets through an open axial end;

a funnel mounted to the open axial end of the cladding, said funnel having a neck with an outside diameter complementary to the inner diameter of the cladding and a coaxial enlarged open end adapted to facilitate reception of fuel, the funnel neck being at least partially inserted within the open axial end of the cladding as a coaxial outwardly protruding attachment;

and a continuous length of shrink tubing tightly encircling and gripping both the cladding and funnel adjacent the open axial end of the cladding to maintain them as a unit during handling of the unfilled cladding and reception of fuel into the cladding through the attached funnel.

5. The combination of claim 4, further comprising:

a cylindrical ring coaxially positioned about the cladding at a location inwardly adjacent its open axial end and covered by said tubing, said ring having a rear annular shoulder facing opposite to the open end of the funnel and adapted to be engageable for pulling the ring, tubing and funnel from the cladding.

6. The combination of claim 4, further comprising:

a cylindrical ring coaxially positioned about the cladding at a location inwardly adjacent its open axial end and covered by said tubing, said ring having a rear annular shoulder facing opposite to the open end of the funnel and adapted to be engageable for pulling the ring, tubing and funnel from the cladding;

said ring having an inner cylindrical surface slidably fitted about the cladding.

7. The combination of claim 4, further comprising:

rear annular shoulder means along the length of shrink tubing facing opposite to the open end of the funnel for engagement during removal of the tubing and funnel from the cladding.

* * * * *